US008186697B2

(12) United States Patent
Stephenson et al.

(10) Patent No.: US 8,186,697 B2
(45) Date of Patent: May 29, 2012

(54) SUSPENSION ARRANGEMENT FOR REAR CASTERED WHEELS ON A WORK MACHINE

(75) Inventors: Roger D. Stephenson, Ottumwa, IA (US); Charles S. Sloan, Blakesburg, IA (US); Stephen K. Parsons, Ottumwa, IA (US)

(73) Assignee: Deere & Company, Moline, IL (US)

( * ) Notice: Subject to any disclaimer, the term of this patent is extended or adjusted under 35 U.S.C. 154(b) by 180 days.

(21) Appl. No.: 12/717,568

(22) Filed: Mar. 4, 2010

(65) Prior Publication Data

US 2010/0201095 A1 Aug. 12, 2010

Related U.S. Application Data

(63) Continuation-in-part of application No. 11/968,759, filed on Jan. 3, 2008, now Pat. No. 7,789,408.

(51) Int. Cl.
*B60G 11/18* (2006.01)
*B60G 11/20* (2006.01)

(52) U.S. Cl. ..... 280/124.166; 280/124.169; 280/124.129

(58) Field of Classification Search ........... 280/124.169, 280/124.166, 124.164, 124.129, 124.13
See application file for complete search history.

(56) References Cited

U.S. PATENT DOCUMENTS

| 2,043,011 | A | * | 6/1936 | Schjolin | 267/257 |
|---|---|---|---|---|---|
| 2,865,031 | A | * | 12/1958 | Maloney | 114/344 |
| 5,816,606 | A | * | 10/1998 | Cruise et al. | 280/124.169 |
| 6,070,898 | A | * | 6/2000 | Dickie et al. | 280/304.1 |
| 6,234,507 | B1 | * | 5/2001 | Dickie et al. | 280/304.1 |
| 6,752,411 | B2 | * | 6/2004 | Few | 280/124.169 |
| 6,905,130 | B2 | * | 6/2005 | Few | 280/124.169 |
| 7,306,247 | B2 | * | 12/2007 | Wu | 280/124.128 |
| 7,789,408 | B2 | * | 9/2010 | Sloan et al. | 280/124.166 |
| 7,832,745 | B2 | * | 11/2010 | Rauch, Jr. | 280/86 |
| 2005/0115746 | A1 | * | 6/2005 | Dunn et al. | 180/6.2 |
| 2008/0007022 | A1 | * | 1/2008 | Jones | 280/124.13 |
| 2009/0152828 | A1 | * | 6/2009 | Bebernes et al. | 280/86 |
| 2010/0259026 | A1 | * | 10/2010 | Patmont et al. | 280/124.169 |

* cited by examiner

*Primary Examiner* — Drew Brown

(57) ABSTRACT

A work machine is provided having a suspension arrangement between an axle of the machine and a caster wheel assembly. The suspension arrangement comprising a torsion spring assembly. The torsion spring assembly having a first spring housing, a second spring housing, and an inner member. The inner member being integrated directly with a wheel arm of the caster wheel assembly. The first and second spring housings being fastened together around the inner member wherein a plurality of elastomeric members are interposed between the inner member and the first and second spring housings. A torsion spring assembly is provided having a first spring housing, a second spring housing, and an inner member, the first and second spring housings being fastened together around the inner member wherein a plurality of elastomeric members are interposed between the inner member and the first and second spring housings.

22 Claims, 9 Drawing Sheets

SUSPENSION ARRANGEMENT FOR REAR CASTERED WHEELS ON A WORK MACHINE

CROSS-REFERENCE TO RELATED APPLICATION

The present application is a Continuation-in-Part of U.S. Ser. No. 11/968,759 filed 3 Jan. 2008 now U.S. Pat. No. 7,789,408.

FIELD OF THE INVENTION

The present invention relates to work machines, and, more particularly, to windrowers with castered rear wheels.

BACKGROUND OF THE INVENTION

Work machines may sometimes include one or more caster wheels which are carried by a machine frame and rotate about a generally vertical axis. The caster wheel assembly typically includes a shaft defining an axis of rotation, a fork rigidly attached to the bottom end of the shaft, and a caster wheel coupled with the distal ends of the fork. A windrower is an example of such a work machine.

Self-propelled windrowers are typically configured with large drive tires in the front and smaller castered tires in the rear. A dual-path hydrostatic system controls both propulsion and direction by controlling the speed and differential speed, respectively, of the front drive wheels. The cutting platform extends crosswise in front of the drive tires.

Ground speeds in the field are increasing. Cutting speeds with rotary cut platforms are often in the 10 to 12 mph range or higher. These ground speeds result in an increasingly rough ride for both the operator and the machine. Larger drive tire sizes offer ride improvement for the front of the machine, but do not address ride issues resulting from the smaller rear tires.

Fatigue of machine components is an additional concern. The rear axle is of particular concern. The rear axle typically consists of an adjustable length beam with a caster-mounted wheel pivoted vertically at each end. The adjustable length of the axle allows the tread width to be adjusted to meet varied needs. The axle is mounted on the machine such that it can pivot horizontally within limits about a point at the midpoint of the beam to allow the rear wheels to conform to uneven ground. The axle itself and the center pivot assembly must withstand horizontal and vertical loads imparted by the caster wheels. These loads increase in magnitude and frequency as ground speeds increase. Loads also increase as tread width is increased to accommodate large windows.

Clearance under the machine must also be adequate to accommodate large windows. The lowest machine clearance is often under the rear axle. The ability to increase this clearance is limited by the pivoting rear axle requirement because the axle must have room to move under the machine frame. One configuration gains clearance by mounting the axle on a cantilevered pivot outside the frame at the rear of the machine. While this configuration increases clearance under the machine, structural and machine length considerations make it undesirable.

It is known to utilize a rear axle suspension on a windrower. In this configuration, the rear axle consists of two, separate beams—one for each caster wheel. The beams are independently pivoted at a point near the centerline of the machine such that each can pivot horizontally within limits. Caster wheels are mounted at the ends of each adjustable length axle, similar to the non-suspended configuration described above. Suspension is provided by placing a pressure-adjustable air bag between a bracket mounted on the frame of the machine and the top of each axle.

While this solution provides a suspension at the rear of the machine, it has the disadvantages of allowing excessive motion at the operator station because there is no inherent damping in the air bag, it changes the castor pivot orientation as it moves through the suspension range, and does not optimize the suspension characteristics by minimizing the unsprung mass. Further, this solution does not increase the clearance under the machine, nor does it diminish the structural concern at the axle pivots.

What is needed in the art is a work machine with castered rear wheels which provide a smooth ride and sufficient ground clearance.

SUMMARY OF THE INVENTION

The invention in one form is directed to a work machine including a frame, at least one drive wheel carried by the frame, at least one rear axle rigidly carried by and substantially immovable relative to the frame, and at least one caster wheel assembly. Each caster wheel assembly includes a shaft, a wheel arm, a suspension and a caster wheel. The shaft is pivotably coupled with an outboard end of a corresponding rear axle. The suspension is coupled with the wheel arm. The caster wheel is coupled with a lower end of the wheel arm.

The invention in another form is directed to a suspension arrangement for a work machine including a frame and a rear axle rigidly carried by and substantially immovable relative to the frame. The suspension arrangement includes a caster wheel assembly having a shaft, a wheel arm, a suspension and a caster wheel. The shaft is pivotably couplable with an outboard end of the rear axle. The caster wheel is coupled with a lower end of the wheel arm. The suspension is in the form of a torsion spring including an outer tube, an inner member, and a plurality of elastomeric members interposed between the outer tube and the inner member. The outer tube is coupled with the shaft, and the inner member is coupled with an upper end of the wheel arm.

The invention in a further form is a work machine having a suspension arrangement between an axle of the machine and a caster wheel assembly. The suspension arrangement comprising a torsion spring assembly. The torsion spring assembly having a first spring housing, a second spring housing, and an inner member. The inner member being integrated directly with a wheel arm of the caster wheel assembly. The first and second spring housings being fastened together around the inner member wherein a plurality of elastomeric members are interposed between the inner member and the first and second spring housings.

The invention in yet another form is a torsion spring assembly is having a first spring housing, a second spring housing, and an inner member, the first and second spring housings being fastened together around the inner member wherein a plurality of elastomeric members are interposed between the inner member and the first and second spring housings.

DESCRIPTION OF THE PREFERRED EMBODIMENT

Figure 1:
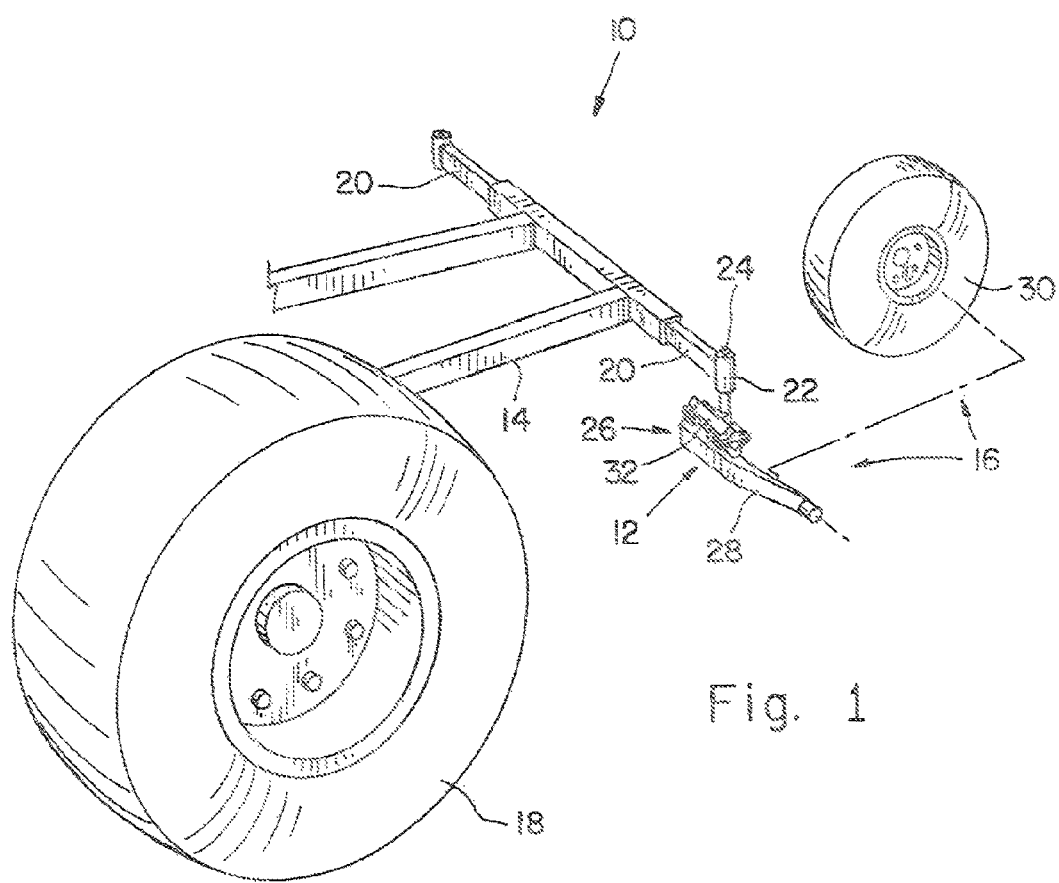
FIG. 1 is a perspective view of a portion of a work machine incorporating an embodiment of a suspension arrangement of the present invention.
Figure 2:
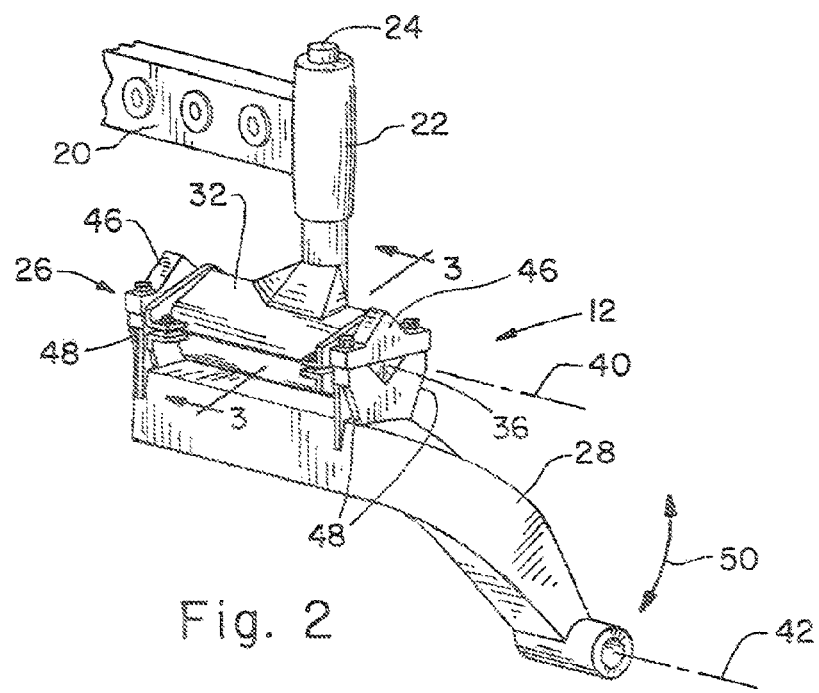
FIG. 2 is a perspective view of the suspension arrangement illustrated in FIG. 1.

Referring now to the drawings, and more particularly to FIGS. 1 and 2, there is shown a portion of a work machine 10 incorporating an embodiment of a suspension arrangement 12 of the present invention. Work machine 10 can be any type of self-propelled work machine using one or more caster wheels, such as a windrower, etc. In the embodiment shown, a portion of the lower part of a work machine in the form of a windrower 10 is shown for illustration.

Windrower 10 includes a frame 14 carrying typical components (not shown) such as, an operator's station, internal combustion engine, etc. A cutting platform is typically detachably mounted at the front end of the machine below the operator's station. The engine compartment is typically mounted behind the operator's station and above a pair of caster wheel assemblies 16. Only the left rear caster wheel assembly 16 is shown in FIG. 1 for simplicity, the right rear caster wheel assembly being configured substantially identical in the illustrated embodiment. Some differences in the configurations of the caster wheel assemblies 16 are possible, as will be described in more detail below.

A pair of drive wheels 18 are carried by frame 14, and hydrostatically driven in known manner. It may be also possible to drive a single wheel 18, depending upon the application.

Rear axle 20 may be a telescoping rear axle, as shown, and is rigidly mounted to and substantially immovable relative to frame 14. Rear axle 20 need not be a telescoping axle. Rear axle 20 includes an outboard end carrying a collar 22 which pivotally couples with a corresponding caster wheel assembly 16, as will be described below.

Each caster wheel assembly 16 includes a pivotable shaft 24, a suspension 26, a wheel arm 28 and a caster wheel 30 coupled with wheel arm 28. Shaft 24 is rotatably carried within collar 22 which is welded or otherwise rigidly affixed to frame 14. Wheel arm 28 is shown as a generally L-shaped single arm which curves around to the side of wheel 30, thus putting wheel 30 generally in line with shaft 24. Wheel arm 28 can also be configured generally U-shaped as a fork with distal ends on opposite sides of wheel 30. The lower or distal end of wheel arm 28 carries a stub shaft (not shown), which in turn carries a wheel hub (not shown) for mounting wheel 30 in known fashion.

Figure 3:
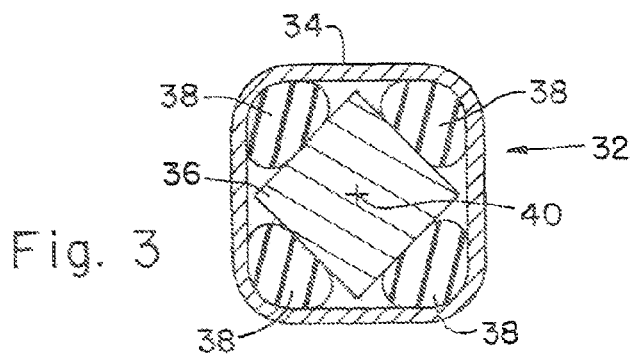
FIG. 3 is a cross sectional view through the suspension arrangement, taken along line 3-3 in FIG. 2.
Figure 4:
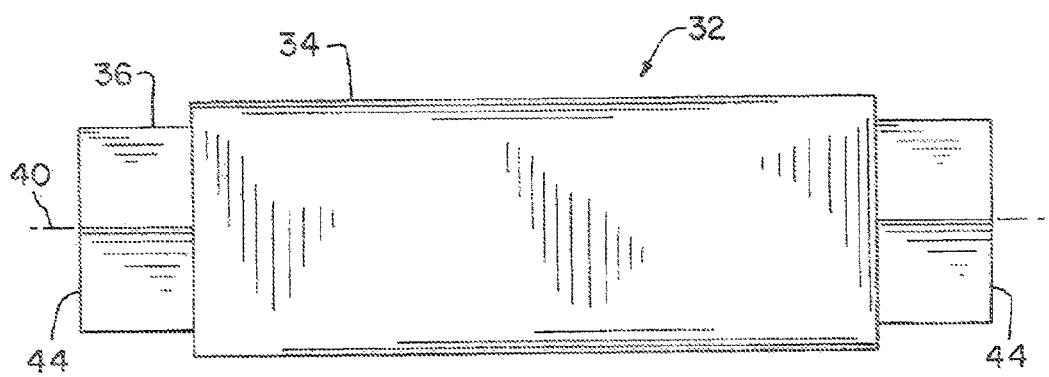
FIG. 4 is a plan view of the torsion spring shown in FIG. 3.
Figure 5:
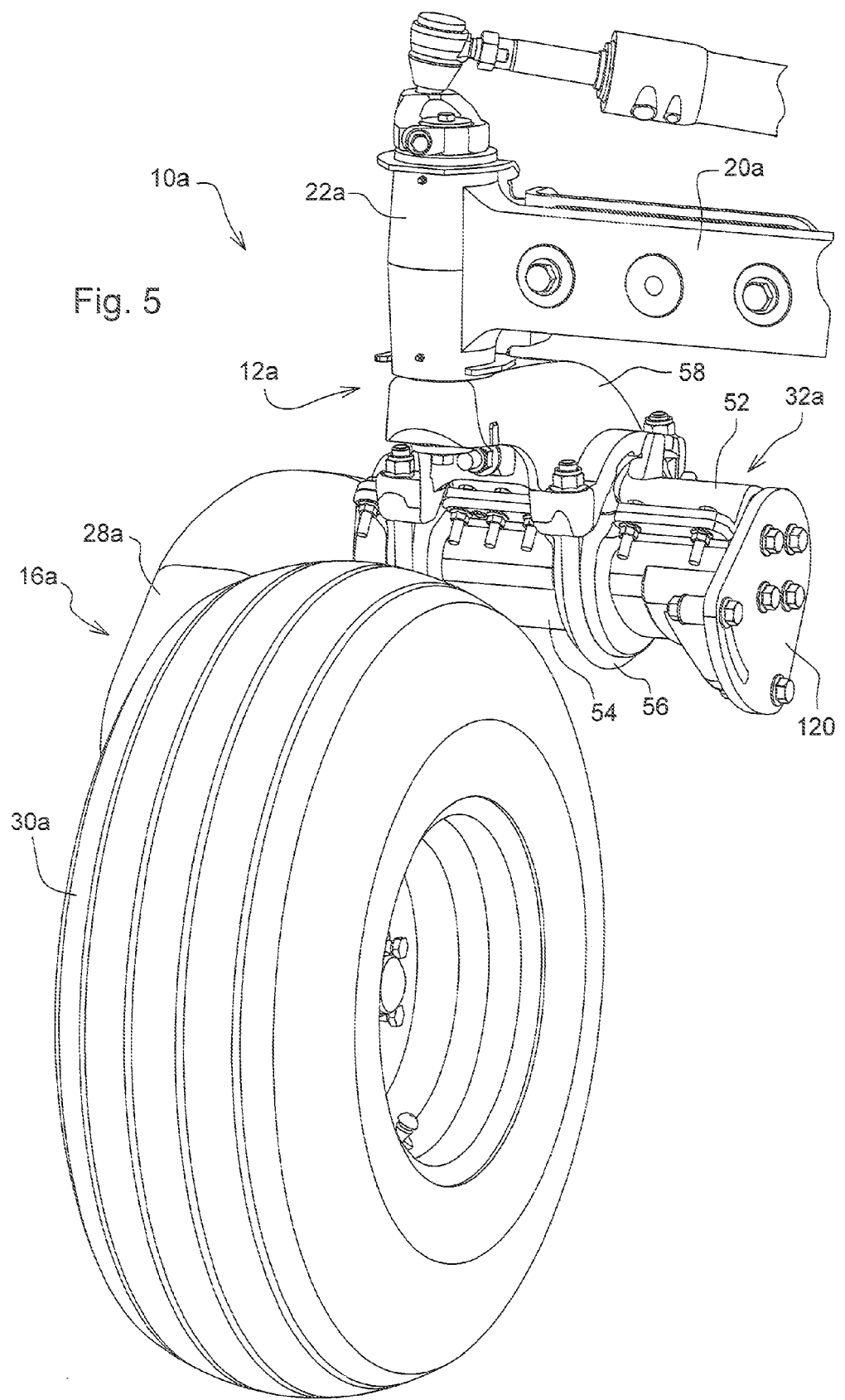
FIG. 5 is a front perspective view of an embodiment of the suspension arrangement.
Figure 6:
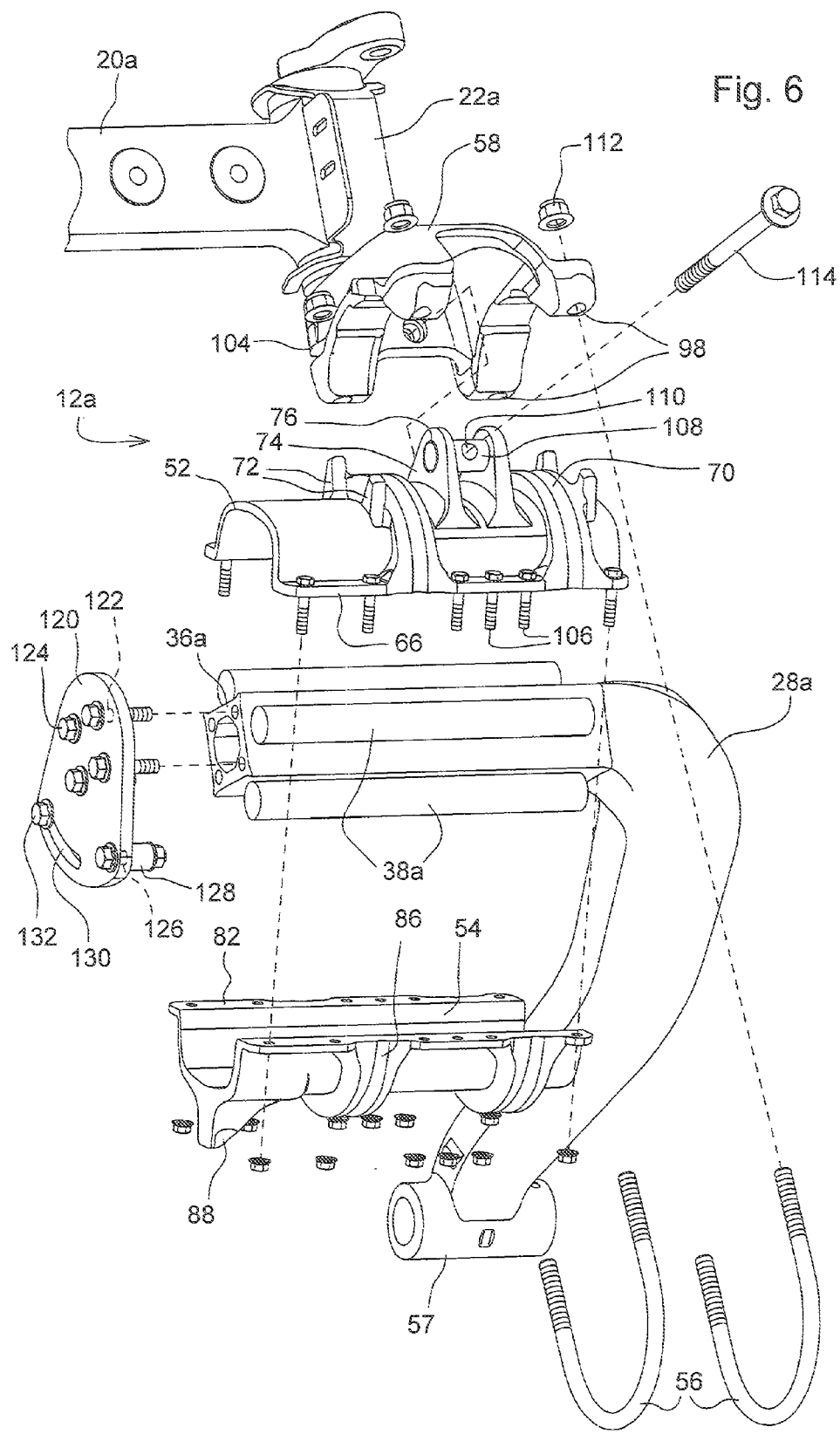
FIG. 6 is an exploded perspective view of the arrangement of FIG. 5.

Referring to FIGS. 2-4, conjunctively, suspension 26 interconnects shaft 24 with wheel arm 28. Suspension 26 is configured with a torsion spring 32 but could possibly be configured with a different type of spring, depending upon the application.

Torsion spring 32 includes an outer tube 34 with a square cross section, an inner member 36 with a square cross section, and a plurality of elastomeric members 38 interposed between outer tube 34 and inner member 36. Outer tube 34 is shown coupled with shaft 24 and inner member with wheel arm 28, but it is also possible to couple outer tube 34 with wheel arm 28 and inner member 36 with shaft 24.

Outer tube 34 is coupled with shaft 24 in an offset manner along a side of outer tube 34. Inner member 36 has an axis of rotation 40 which is generally parallel to an axis of rotation 42 of caster wheel 30. Inner member 36 includes opposite ends 44 which extend axially beyond the ends of outer tube 34. A pair of clamps 46 are rigidly connected (e.g., welded) with the upper surface of the top, horizontal portion of wheel arm 28. Each clamp 46 is clamped with a corresponding end 44 of inner member 36. Each clamp 46 includes a pair of support arms 48 which extend upwardly at an angle of approximately 45° relative to vertical. This splits forces applied by the ground into two component force vectors, regardless of whether the applied force is in a horizontal or vertical direction. The force vectors tangent to the axis of rotation 40 of inner member 36 assure that a rotational force is applied to torsion spring 32.

During operation, forces are applied by the ground to wheel 30. These forces may generally either be parallel to the ground (such as an object impinging upon wheel 30), or in a vertical direction (such as a bump or the like). This causes wheel 30 to pivot in an arced manner about the axis of rotation 40 of inner member 36, as indicated by the curved, double headed arrow 50 in FIG. 2. This rotational movement of wheel arm 28 carrying wheel 30 in turn compresses elastomeric members 38 between inner member 36 and outer tube 34. This biases inner member 36 back to the static position, and also damps vibrations which are transferred to frame 14.

With reference now to FIGS. 5-13 it will be seen that an alternative embodiment of the suspension described above is illustrated in detail. More particularly, in FIGS. 5 and 6 it can be seen that the alternative suspension arrangement is similar to that shown in FIGS. 1 and 2 described above, in that a portion of a windrower 10a is illustrated having a suspension arrangement 12a. The suspension arrangement 12a is provided between a rear axle 20a of the machine 10a and the caster wheel assembly 16a. It will be noted that the basic components of the suspension described above are present within the alternative embodiment, but in a different form. More particularly, it can be seen that the inner member 36a of the torsion spring assembly 32a is integrated directly with the wheel arm 28a. It will also be noted that instead of a unitary outer tube as described above, the torsion spring assembly 32a includes an upper spring housing 52 and a lower spring housing 54, both of which will be described in more detail below. It will also be seen that the upper and lower spring housings 52 and 54 respectively are fastened together around the integrated inner spring member 36a of the wheel arm 28a and elastomeric members 38a to form the torsion spring assembly 32a. The elastomeric members 38a having a generally circular cross-section when in an uncompressed state. The torsion spring assembly 32a is then clamped via u-clamps 56 to a carrier 58 which will also be described in more detail below. The carrier 58 is in turn mounted to the axle 20a by way of a pivot shaft (not shown) which is pivotally disposed within the collar 22a of the axle 20a.

Figure 7:
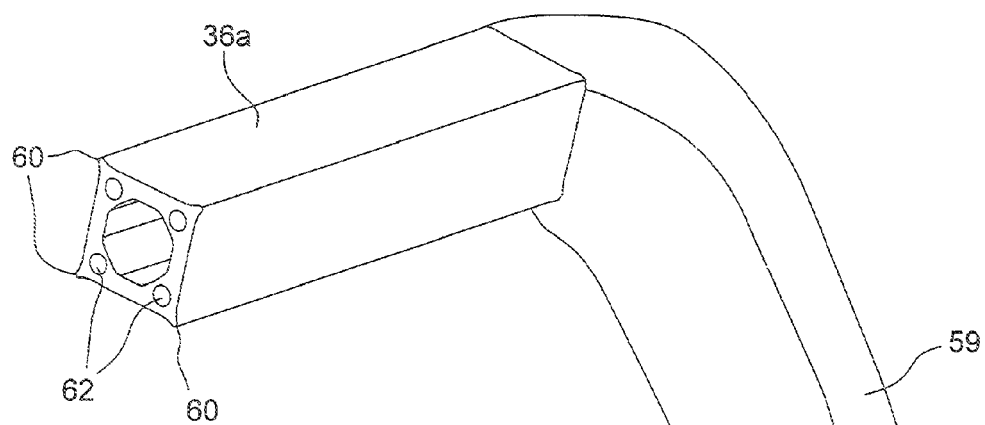
FIG. 7 is a perspective view of the wheel arm of the arrangement of FIG. 5.

FIG. 7 illustrates in more detail the alternative wheel arm 28a. Wheel arm 28a is, as in the previous embodiment, a unitary generally L-shaped arm which curves around to the side of wheel 30a. Also as described above the lower or distal end portion 59 of wheel arm 28a includes a collar 57 that carries a stub shaft (not shown), which in turn carries a wheel hub (not shown) for mounting wheel 30a in known fashion. As mentioned previously however the wheel arm 28a differs from the previous embodiment in that the upper leg of the wheel arm is comprised of the inner member 36a of the torsion spring assembly 32a. This inner member 36a is disposed generally perpendicular to the lower portion 59 of the wheel arm 28a and has a uniquely shaped cross-section. Unlike the inner member (36) of the torsion spring (32) of the earlier described embodiment the inner member 36a of the alternative embodiment, while maintaining a generally square cross-section, has been modified, for reasons which will be described later, to include radiused extensions 60 at each corner. Also for reasons to be described below the inner member 36a includes a plurality of fastener apertures 62 in the end thereof.

Figure 8:
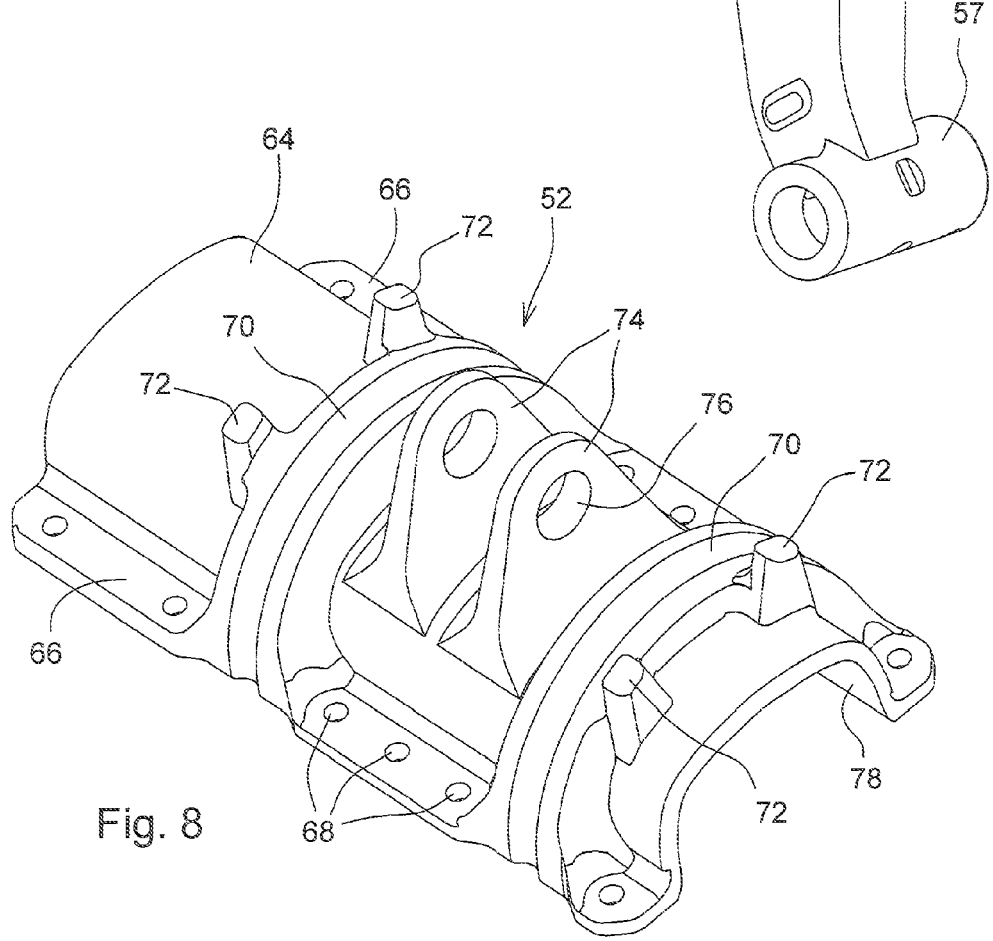
FIG. 8 is a perspective view of the upper spring housing of the arrangement of FIG. 5.

In FIG. 8 the upper spring housing 52 is illustrated. The upper spring housing 52 has a generally curved upper surface 64 flanked on either side by flanges 66. The flanges 66 include a plurality of fastener apertures 68. The upper curved surface 64 is banded by a pair of clampways 70 and each clampway 70 has a pair of spaced stops 72 disposed adjacent thereto. A pair of mounting tabs 74 are disposed between the clampways 70 with each mounting tab 74 having an aperture 76 therein. The inner surface 78 of the upper spring housing will be described in more detail in conjunction with the description of FIG. 13 below.

Figure 9:
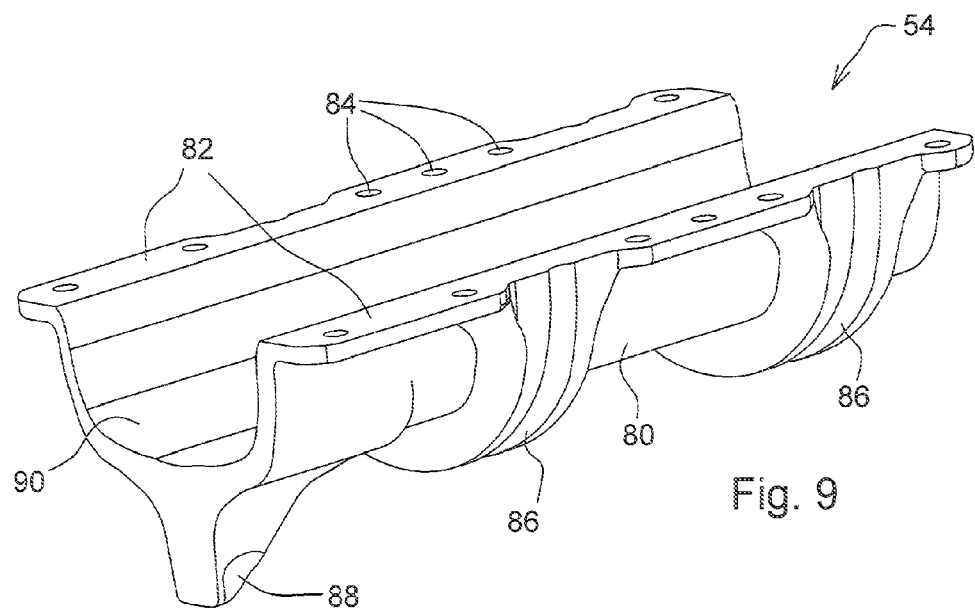
FIG. 9 is a perspective view of the lower spring housing of the arrangement of FIG. 5.
Figure 10:
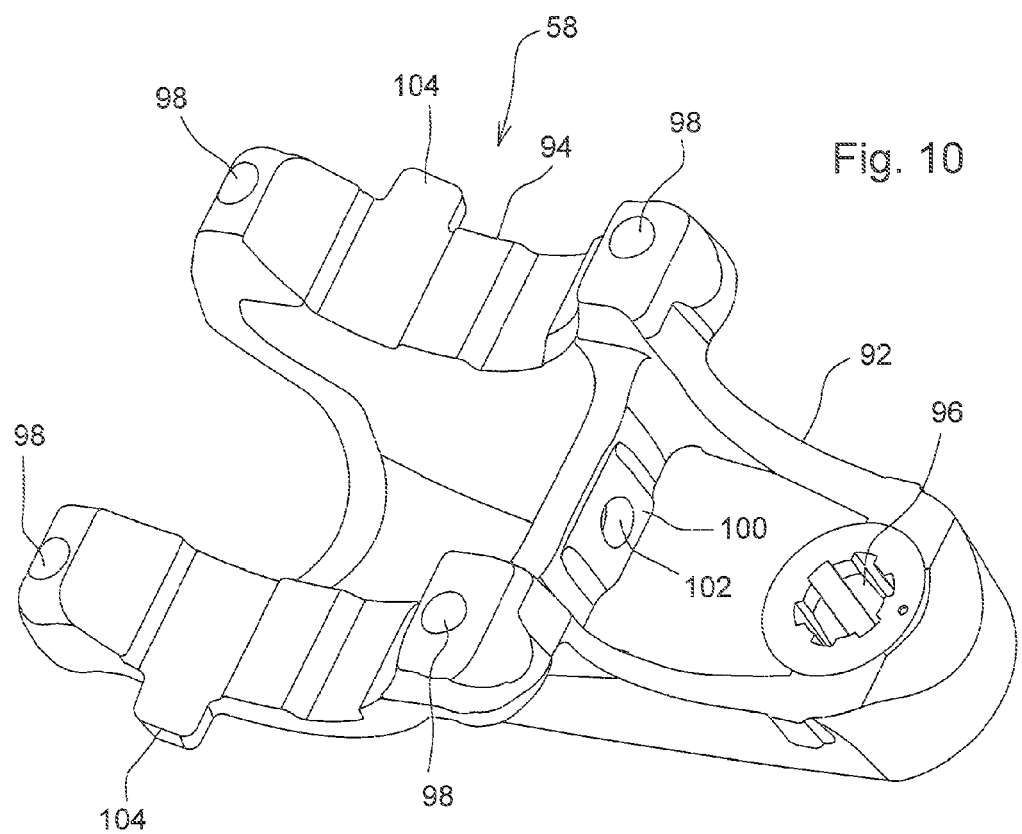
FIG. 10 is a perspective view of the carrier of the arrangement of FIG. 5.

The lower spring housing 54 is illustrated in FIG. 9 and like the upper spring housing 52 includes a generally curved outer surface 80 flanked by flanges 82. A plurality of fastener apertures 84 are provided in the flanges 82. The lower spring housing 54 also includes clampways 86. For reasons which will become apparent as the description continues, a tab 88 is provided that extends outward from the outer surface 80 at one end of the lower spring housing 54. The inner surface 90 of the lower spring housing will be described in more detail in conjunction with the description of FIG. 13.

FIG. 9 illustrates the carrier 58 in more detail. As shown the carrier 58 generally includes a shaft mounting portion 92 and a spring mounting portion 94. Shaft mounting portion 92 is adapted to receive a partially splined pivot shaft (not shown) in a splined aperture 96 for pivotally mounting the carrier 58 to the collar 22a of the axle 20a. The spring mounting portion 94 of the carrier 58 is adapted to mateably attach to the assembled upper 52 and lower 54 spring housings and accordingly has two pairs of clamp apertures 98. Additionally the carrier 58 includes a surface 100 generally between the shaft mounting portion 92 and the spring mounting portion 94. For reasons which will be further described below, an aperture 102 is provided in the surface 100. Additionally, it will be noted that the carrier 58 includes a pair of stop lugs 104 extending outwardly therefrom, for reasons which will become apparent as the description continues.

Figure 11:
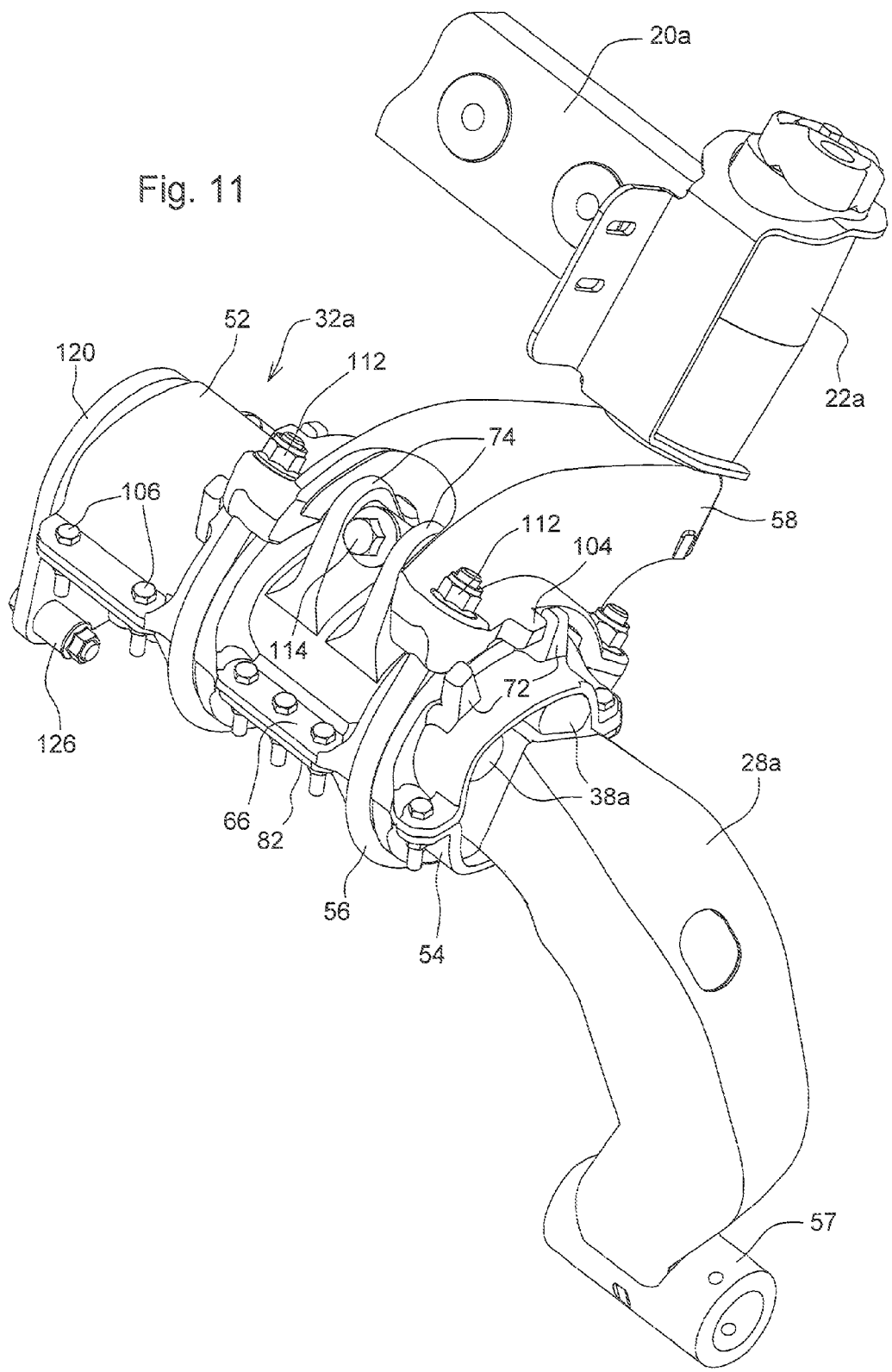
FIG. 11 is a rear perspective view of the arrangement of FIG. 5.
Figure 12:
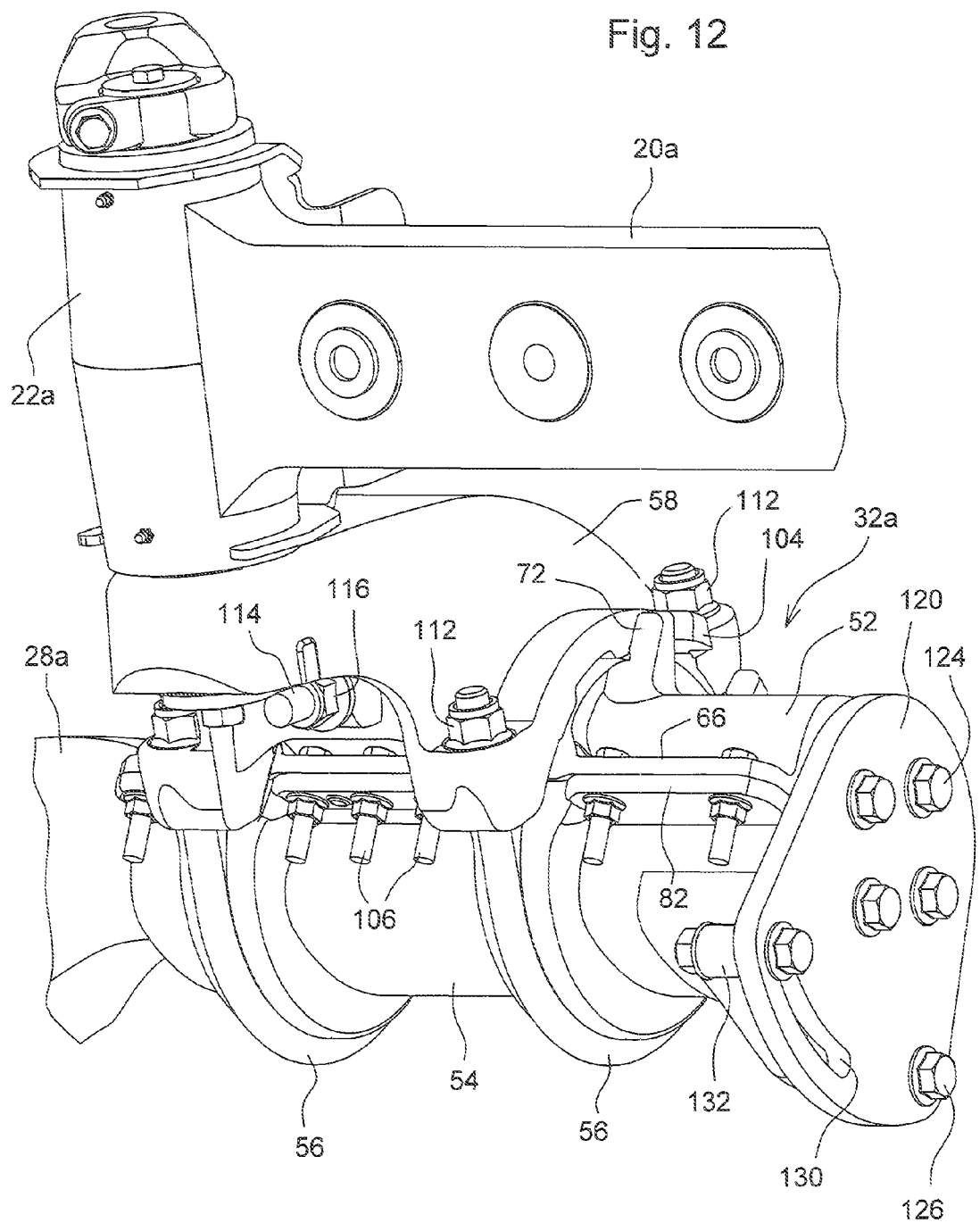
FIG. 12 is a rear perspective close-up view of the torsion spring assembly and carrier of the arrangement of FIG. 5; and, FIG. 13 is an elevational end view of the torsion spring assembly and carrier of the arrangement of FIG. 5.

With continued reference to FIGS. 5-10 and now also to FIGS. 11 and 12 the assembly of the alternative embodiment of the suspension arrangement will be described in more detail. More particularly it will be seen that the wheel arm 28a is, along with the elastomeric members 38a, interposed between the upper spring housing 52 and, the lower spring housing 54. The flanges 66 and 82 respectively, of the upper and lower spring housings 52 and 54 are matingly attached to one another using fasteners 106, thereby clamping the wheel arm 28a and elastomeric members 38a between the upper and lower housings to form the torsion spring assembly 32a.

A pin 108 is fitted in the apertures 76 of the mounting tabs 74 of the upper spring housing 52. As can be seen the pin 108 is provided with an aperture 110 that is located between the mounting tabs 74 when the pin 108 is assembled to the upper spring housing 52. The torsion spring assembly 32a is then clamped to the carrier 58 using the U-shaped clamps 56. The torsion spring assembly 32a is positioned within the carrier 58 such that the stop lugs 104 of the carrier 58 are located between the pairs of stops 72 provided on the upper spring housing 52. The clamps 56 are positioned in the clampways 70 and 86 of the upper and lower spring housings respectively and the threaded ends thereof are received in the clamp apertures 98 of the carrier and secured thereto using nuts 112. While not illustrated in detail it will be appreciated that the carrier is ultimately mounted to the vehicle axle 20a by way of the splined pivot shaft (not shown) that is pivotally secured in the collar 22a of the axle in a known manner. Similarly the wheel 30a is rotatably secured to the wheel arm 28a in a known manner. Thus the suspension arrangement of the present disclosure becomes evident. It will be noted that the U-shaped clamping arrangement between the torsion spring assembly 32a and the carrier 58 could allow for some pivotal movement between the torsion spring assembly 32a and the carrier 58. This pivotal movement is limited in the first instance by the interaction of the stop lugs 104 of the carrier 58 and the stops 72 of the upper spring housing 52. More particularly, the rotation of the spring housing relative to the carrier is halted whenever the stop lugs 104 contact the stops 72. Additionally, a drawbolt 114 is provided which passes through the aperture 110 of the pin 108 secured in the mounting tabs 74, and the aperture 102 provided in the surface 100 of the carrier 58. The drawbolt 114 is secured using a nut 116 or other appropriate means. It will thus be recognized that the pivotal movement between the torsion spring assembly 32a and the carrier 58 can be limited in the second instance by selective adjustment of the drawbolt 114. More importantly, the adjustment of the drawbolt 114 and nut 116 allows for the pivotal adjustment of the torsion spring assembly 32a relative to the carrier 58 thereby allowing for, among other things, an adjustable ride height. The torsion spring assembly 32a can be rotated relative to the carrier 58, and thus to the axle, to adjust for ride height, rubber creep, or load changes. In the case of windrowers, it is sometimes desirable to adjust the spring to change ride height or to adjust the force to accommodate a change in platform weight or rear ballast.

Another feature of the suspension arrangement is the provision of a stop plate 120 for limiting the rotation of the inner member 36a relative to the spring housings. More particularly, it will be seen in FIGS. 6, 11 and 12 that the stop plate 120 is a flat member having apertures 122 for securing it to the end of the inner member 36a by way of bolts 124 threaded into the previously noted apertures 62. The stop plate 120 is shaped and located so that a lobe of the plate extends as shown beyond the inner member 36a to the extent of the tab 88 of the lower spring housing 54. As can be seen the plate 120 is provided with an aperture 126 in which a stop pin 128 is secured. Similarly, the plate 120 is provided with an arcuate slot 130 in which a second stop pin 132 is releasably secured. Accordingly, when the stop plate 120 is secured to the inner member 36a the stop pins 128 and 132 are located on opposite sides of tab 88 of lower spring housing 54, thereby limiting the rotation of the inner member 36a relative to the spring housings. The amount of rotation can be limited, within a range, by adjusting the position of the stop pin 132 in the arcuate slot 130. This design allows a rotation stop to be adjusted to different positions as needed. To facilitate changing a flat tire or performing similar service tasks, the adjustable stop feature can be used to limit the amount of downward travel as the rear axle of the machine is lifted. This allows the stop to be engaged regardless of the amount of weight being carried by the tire.

A second function of the stop plate feature is to limit the upward travel of the wheel relative to the frame as load is applied. The stop feature can have multiple positions to serve different needs. In one position this stop can serve as a limit to prevent overstressing the rubber spring components. Alternate positions can be used for such things as limiting the amount of suspension travel when shipping a machine to ensure the machine does not bounce against tie downs that secure the machine to the truck.

Figure 13:
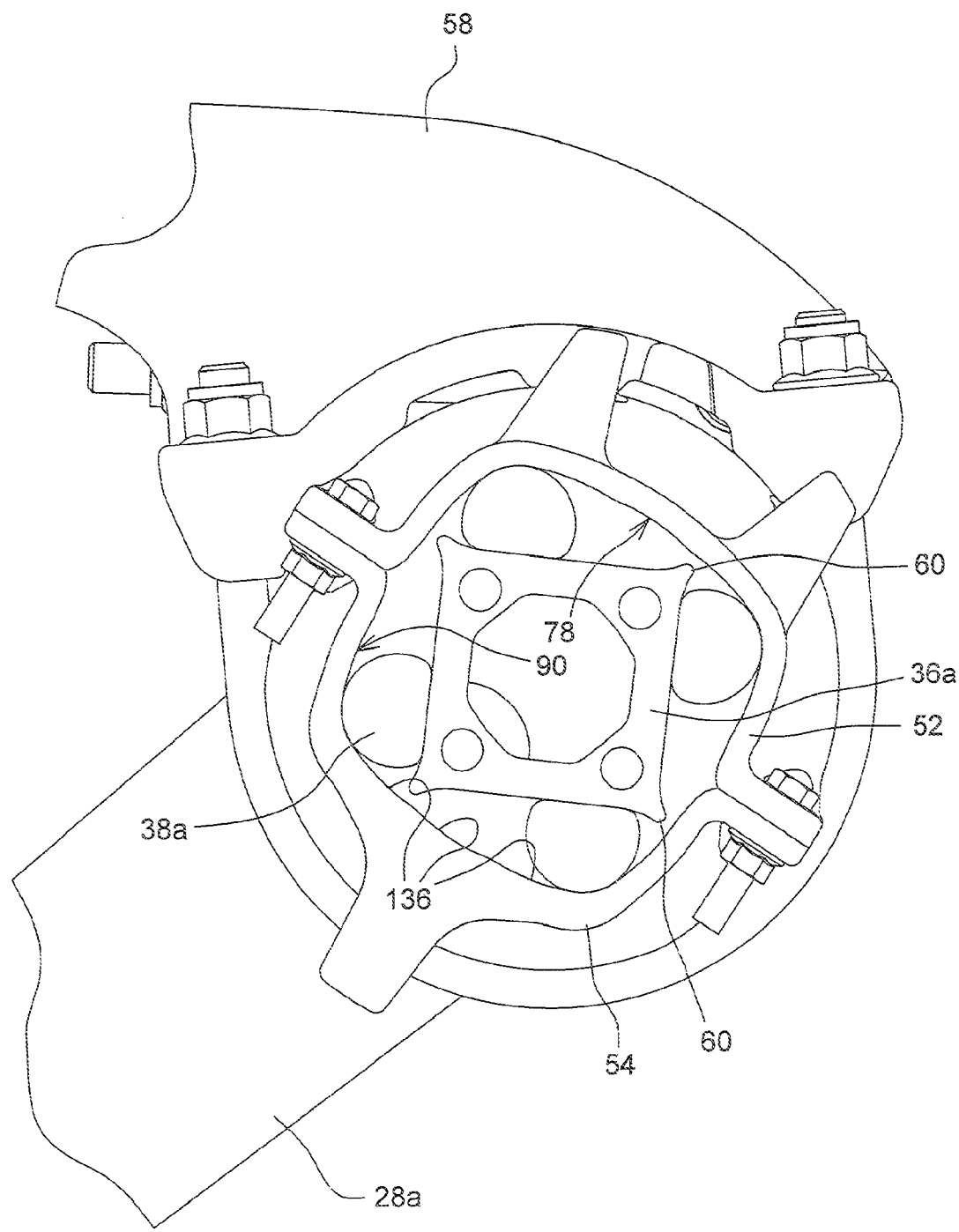

Referring now to FIG. 13 it can be seen that the inner member 36a and inner surfaces 78 and 90 of upper and lower spring housings 52 and 54 respectively are uniquely shaped to allow tailoring a spring curve to match up with suspension needs. Known rubber torsion springs have a high initial load on the rubber to give adequate torque. This combined with an inner member that is often square results in very high local loads within the rubber thereby causing premature failure. The embodiment described herein avoids such problems by utilizing a substantially square inner member with radiused extensions 60 to keep the elastomeric members 38a from rolling around the corners of the inner member 36a and tearing. The inner housing surfaces 78 and 90, instead of having a flat profile or continuous radius, consist of multiple radiuses 136 blended together to give a soft spring rate in the normal operating range while providing a higher rate as the spring is rotated more. This provides results similar to so called "overload springs" used on trucks with leaf spring suspension. The result is that the elastomeric members 38a are compressed between more nearly parallel surfaces at high angles of rotation giving a more even stress distribution and better life for the elastomeric members 38a.

It should now be evident that the alternate embodiment offers several advantages over previously known solutions. Use of the elastomeric torsion spring provides suspension of the caster wheel, eliminates the need for lubrication of pivot joints, and provides damping without the need for shock absorbers. Further, by incorporating the inner member of the spring into the structural element that supports the wheel, the need for a separate spring and the joints needed to attach a separate part is eliminated. Additionally, the outer members of the torsion spring can be disassembled by the user to allow replacement of the elastomeric parts without the added expense of replacing steel parts.

Having described the preferred embodiment, it will become apparent that various modifications can be made without departing from the scope of the invention as defined in the accompanying claims.

The invention claimed is:

1. A work machine having a suspension arrangement provided between an axle of the machine and a caster wheel assembly, the suspension arrangement comprising a torsion spring assembly, the torsion spring assembly having a first spring housing, a second spring housing, and an inner member, the inner member being integrated directly with a wheel arm of the caster wheel assembly, the first and second spring housings being fastened together around the inner member wherein a plurality of elastomeric members are interposed between the inner member and the first and second spring housings wherein the torsion spring assembly is mounted to the axle by way of a carrier, the carrier being pivotally mounted to the axle and the torsion spring assembly being rotatably clamped to the carrier.

2. A work machine according to claim 1 wherein the inner member has a generally square cross-section with radiused extensions at each corner.

3. A work machine according to claim 1 wherein the torsion spring assembly is clamped to the carrier by way of U-shaped clamps.

4. A work machine according to claim 1 wherein wheel arm is a unitary, generally L-shaped, arm wherein a distal end portion thereof has a collar for mounting a wheel.

5. A work machine according to claim 4 wherein the inner member is disposed generally perpendicular to the distal end portion of the wheel arm.

6. A work machine according to claim 1 wherein the inner member has a generally square cross-section with radiused extensions at each corner.

7. A work machine according to claim 6 wherein the first spring housing has a pair of mounting tabs disposed between at least one pair of clampways with each mounting tab having an aperture therein, the clampways having a pair of spaced stops disposed adjacent thereto.

8. A work machine according to claim 7 wherein the carrier has at least one stop lug extending outwardly therefrom.

9. A work machine according to claim 8 wherein the torsion spring assembly is positioned within the carrier such that the at least one stop lug is located between the at least one pair of stops provided on the upper spring housing.

10. A work machine according to claim 9 wherein an arrangement of the torsion spring assembly and the carrier allows for pivotal movement between the torsion spring assembly and the carrier, the pivotal movement being limited by the interaction of the stop lugs of the carrier and the stops of the first spring housing, the rotation of the spring housing relative to the carrier being halted whenever the stop lugs contact the stops.

11. A work machine according to claim 7 wherein a pin is fitted in the apertures of the mounting tabs of the first spring housing, the pin having an aperture that is located between the mounting tabs when the pin is assembled to the first spring housing.

12. A work machine according to claim 11 wherein a drawbolt passes through both the aperture of the pin secured in the mounting tabs, and an aperture provided in a surface of the carrier, the drawbolt being adjustably secured to the carrier so that pivotal movement between the torsion spring assembly and the carrier can be limited by selective adjustment of the drawbolt.

13. A work machine according to claim 7 wherein the U-shaped clamps are positioned in the clampways of the upper and lower spring housings and ends thereof are secured to the carrier.

14. A work machine according to claim 1 wherein the second spring housing has a tab extending outward from the outer surface at one end thereof.

15. A work machine according to claim 14 wherein a stop plate is secured to an end of the inner member, the stop plate extending beyond the inner member to an extent of the tab of the second spring housing.

16. A work machine according to claim 15 wherein the stop plate has a first stop pin secured thereto and a slot in which a second stop pin is releasably secured, so that when the stop plate is secured to the inner member the first and second stop pins are respectively located on opposite sides of the tab of the second spring housing thereby limiting the rotation of the inner member relative to the first and second spring housings.

17. A work machine according to claim 16 wherein an amount of relative rotation between the inner member and the first and second spring housings can be limited within a range by adjusting the position of the second stop pin in the slot.

18. A work machine according to claim 1 wherein the inner housing surfaces of the first and second spring housings consist of multiple radiuses blended together to give a soft spring rate in a normal operating range while providing a higher rate as the inner member is rotated more and the elastomeric members are compressed between more nearly parallel surfaces at high angles of rotation.

19. A torsion spring assembly for use as a suspension for a vehicle, the torsion spring assembly comprising a first spring housing, a second spring housing, and an inner member, the first and second spring housings being fastened together around the inner member wherein a plurality of elastomeric members are interposed between the inner member and the first and second spring housings, the second spring housing having a tab extending outward from the outer surface at one end thereof, a stop plate secured to an end of the inner member, the stop plate extending beyond the inner member to an extent of the tab of the second spring housing wherein the stop plate has a first stop pin secured thereto and a slot in which a second stop pin is releasably secured, so that when the stop plate is secured to the inner member the first and second stop pins are respectively located on opposite sides of the tab of the second spring housing thereby limiting the rotation of the inner member relative to the first and second spring housings.

20. A torsion spring assembly according to claim 19 wherein the inner member has a generally square cross-section with radiused extensions at each corner.

21. A torsion spring assembly according to claim 19 wherein an amount of relative rotation between the inner member and the first and second spring housings is limited within a range by selective adjustment of the position of the second stop pin in the slot.

22. A torsion spring assembly according to claim 20 wherein the inner housing surfaces of the first and second spring housings consist of multiple radiuses blended together to give a soft spring rate in a normal operating range while providing a higher rate as the inner member is rotated more and the elastomeric members are compressed between more nearly parallel surfaces at high angles of rotation.

\* \* \* \* \*